Jan. 24, 1961 W. M. BUSTIN 2,969,503
MEASUREMENT OF POTENTIAL GRADIENTS
Filed Dec. 6, 1957 4 Sheets-Sheet 1

William M. Bustin Inventor
By W. P. T Hickman Attorney

Jan. 24, 1961   W. M. BUSTIN   2,969,503
MEASUREMENT OF POTENTIAL GRADIENTS
Filed Dec. 6, 1957   4 Sheets-Sheet 2

William M. Bustin   Inventor
By W. D. Heckman   Attorney

Jan. 24, 1961 W. M. BUSTIN 2,969,503
MEASUREMENT OF POTENTIAL GRADIENTS
Filed Dec. 6, 1957 4 Sheets-Sheet 3

William M. Bustin Inventor

By W.D. Feichman Attorney

Jan. 24, 1961 W. M. BUSTIN 2,969,503
MEASUREMENT OF POTENTIAL GRADIENTS
Filed Dec. 6, 1957 4 Sheets-Sheet 4
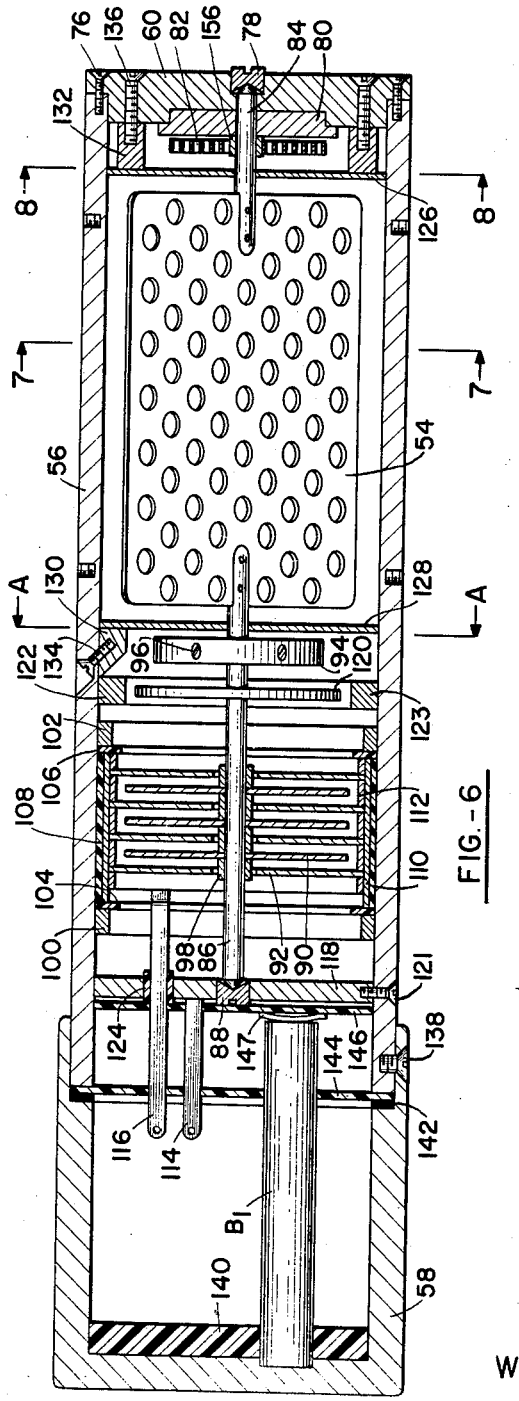
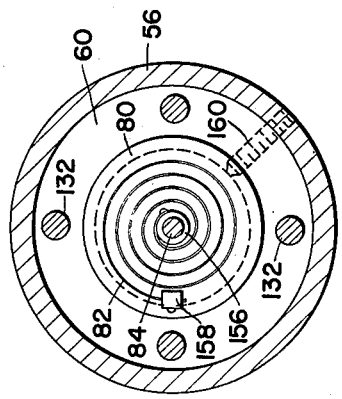
FIG.-8
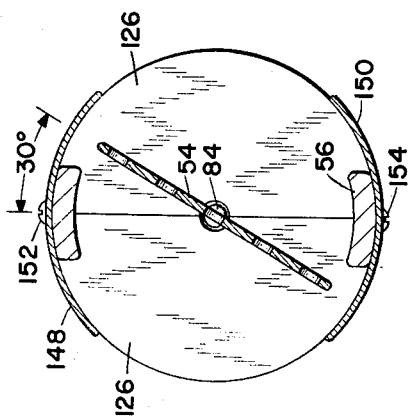
FIG.-7
FIG.-6
William M. Bustin Inventor
By W. W. T. Heilman Attorney

2,969,503

MEASUREMENT OF POTENTIAL GRADIENTS

William M. Bustin, Summit, N.J., assignor to Esso Research and Engineering Company, a corporation of Delaware Filed Dec. 6, 1957, Ser. No. 701,208

13 Claims. (Cl. 324—72)

The present invention relates to a method and apparatus for determining magnitude and line of action of potential gradients in electrostatic fields. It relates more particularly to a method and apparatus for determining magnitude and line of action of potential gradients in electrostatic fields existing in the vapor spaces of storage vessels which are partially filled with liquids such as petroleum hydrocarbons.

During routine handling such as filling or emptying a storage tank, combustible hydrocarbon liquids may accumulate static electric charges. These charges in and on the hydrocarbon liquid induce an electrostatic field in the tank vapor space above the liquid. This field may be thought of as a pattern of lines of electrostatic force running from the liquid surface to the wall and roof boundaries of the vapor space and passing at right angles or normally through a series of surfaces of constant potential.

Strength of an electrostatic field is determined as the rate of change of potential per unit of distance as one moves through the field along a line of electrostatic force. Common units of expressing field strength are volts/in. and volts/cm. The term "field strength" and "potential gradient" are equivalents. Strength of an electrostatic field may not be uniform throughout the field. For example, in the vapor space of a tank containing fluids such as hydrocarbons, there will be variations in field strength along any given line of electrostatic force and from line to line; that is, there will be a range of values of potential gradient throughout the field.

Potential gradients exist as vector point functions having direction as well as magnitude. The gradient vector at any point in an electrostatic field is tangent to the line of electrostatic force passing through that point. Since only one line of electrostatic force can go through a given point in a field, each point in an electrostatic field will have a unique gradient vector. The overall significance of potential gradient values in the vapor space above a stored hydrocarbon liquid is that they indicate the likelihood of sparking in the vapor space with attendant danger of explosion. Most gases at atmospheric pressure have a dielectric strength of approximately 30,000 volts/cm., and sparking is likely if local values of potential gradient exceed this figure. Potential gradient values are highest near the charge; consequently, gradients may be expected to be higher near the liquid surface in a partially filled liquid hydrocarbon storage tank than far up in the vapor space.

Existing methods and apparatus for measuring electrostatic field potential gradients require a solid electrical wire or lead from the field probe or point of measurement to the reading instrument or point of observation. Use of such apparatus in the vapor spaces of storage tanks for hydrocarbon liquids has several disadvantages. A conventional field probe and its connecting wire hanging in a tank introduce a vertical equipotential line, the insulation of the wire being permeable by the field, which will distort severely the surfaces of constant potential otherwise existing in the tank vapor space. These surfaces will tend to be crowded down locally beneath the probe, and the gradient signal transmitted by the probe will almost certainly indicate some value quite different from the normal potential gradient at the probe location. Also the local crowding together of surfaces of constant potential will increase potential gradients in a region where they are likely to be high initially, that is, near the liquid surface so that incipient sparking conditions are made more dangerous still. In this sense, use of existing equipment may create a hazard.

It is an object of the present invention to provide a method and apparatus for determining the magnitude and line of action of potential gradients in electrostatic fields. It is a more specific object to provide a method and apparatus for determining magnitude and line of action of potential gradients in electrostatic fields existing in vapor spaces of tanks for the storage of hydrocarbon liquids, which method and apparatus will not require any continuous solid electrical conductor between the point of potential gradient detection and the point of observation.

According to the present invention an electrostatic field probe is provided which is capable of transmitting a wireless signal with a frequency that is a function of potential gradient. This probe is capable of being positioned in any location in the vapor space of a storage tank partially filled with a liquid hydrocarbon. The probe is entirely self-contained, having its own battery power source for signal transmission. The probe signal is capable of detection by a radio receiver located outside the storage tank so long as the receiver antenna is within the tank. It is necessary that there be no tank wall shielding between the receiver antenna and the transmitting antenna of the probe.

The element of the probe which is sensitive to potential gradients is an uncharged rectangular metal deflector vane which is mounted with axial symmetry on a rotatable shaft. This shaft also carries the rotor elements of a variable capacitor which determines the transmitting frequency of the probe. A rest position for zero potential gradient is established for the shaft and the elements carried on it relative to the remainder of the probe assembly. A spring attached to the shaft provides restoring torque when the shaft is turned out of its zero potential gradient position.

When the probe is placed in an electrostatic field, the initially uncharged deflector vane is subjected to electrostatic induction which effects a charge separation so that charges of opposite sign are concentrated on either side of the vane's axis. A turning moment or torque on the vane results due to action between the field and the separated charges on the vane. For a balanced, unshielded rectangular vane in an electrostatic field with its axis of balance perpendicular to the direction of the field, this torque is given in rationalized units by the equation $$\tau = \frac{\pi \epsilon}{8} A B^2 E^2 \sin 2\alpha \qquad (1)$$

in which $\tau$ = field torque on the vane;
$\epsilon$ = permitivity of the medium;
$A$ = dimension of the vane parallel to its axis;
$B$ = dimension of the vane perpendicular to its axis;
$E$ = electrostatic field potential gradient in the locality of the vane;
$\alpha$ = angle between the vane and a surface perpendicular to the direction of the field (a surface of constant potential).

In Eq. 1 dimension A is assumed sufficiently great that end effects are of minor overall significance.

As a result of field torque on the vane of the probe assembly of this invention, the entire vane, shaft, and capacitor rotor assembly turn until the electrostatic field torque is balanced by torque from the spring mentioned previously, which is deflected as the vane assembly rotates. The entire probe assembly exposed to the electrostatic field is all at the same potential, and is essentially unaffected by any charge deposited on it if it accidentally comes in contact with a charged object such as a droplet splashing off the hydrocarbon liquid surface.

Angular deflection of the deflector vane shaft from zero position is a function of the electrostatic field torque which varies with the potential gradient. Final position of the shaft, since it controls adjustment of the tuning capacitor of the transmitting circuit of the probe, determines the circuit output frequency. Accordingly this frequency is a function of potential gradient. The observer determiens the transmitting frequency of the probe by proper tuning of a radio receiver.

The invention and its objects may be more fully understood from the following description when it is read in conjunction with and with reference to the accompanying drawings in which:

Fig. 6 represents a longitudinal section through the electrostatic field probe showing the deflector vane, rotatable shaft and variable capacitor assembly, and elements of the oscillator circuit shown in Fig. 4.

Fig. 7 represents a transverse section through the electrostatic field probe on the plane 7—7 of Fig. 6 showing the zero potential gradient or rest position of the deflector vane.

Fig. 8 represents a transverse section through the electrostatic field probe on the plane 8—8 of Fig. 6 showing the torque spring for the deflector vane assembly and means for obtaining the desired rest position of the vane as shown in Fig. 7.

Figure 1:
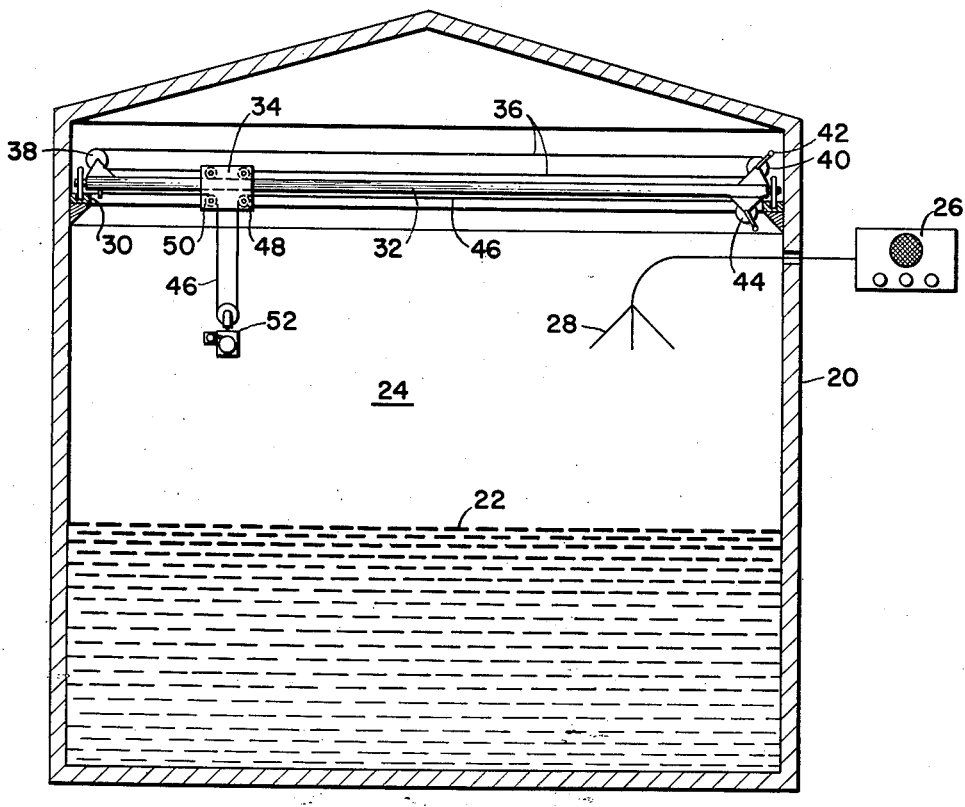
Fig. 1 represents a vertical section through a typical tank for the storage of liquid materials, and illustrates one suitable means for supporting and locating the electrostatic field probe of this invention in the tank vapor space. This figure shows also a radio receiver outside the tank for detecting wireless signals from the probe.

Referring now to the drawings, 20 in Fig. 1 is a round tank for the storage of liquid hydrocarbons. It is partially filled with a liquid whose surface is designated 22. Above this surface there is a vapor space 24. Outside the tank is a radio receiver 26 having its antenna 28 inside. A grooved circumferential track 30 is fitted inside the tank near the top, and carried on this track is a diametral rail 32 having wheels at either end running in the track groove. This rail can be turned into any position across the tank.

Mounted on rail 32 is a wheeled traversing head having side plate 34. This head can be moved back and forth the full length of the rail by string 36, each end of which is attached to the head and which passes over pulleys 38 and 40 both mounted on rail 32, and to the latter of which crank handle 42 is affixed. On the underside of rail 32, nearly below pulley 40, is a windup reel 44 also equipped with a crank handle. A string 46 has one end attached to this reel; passes over pulleys 48 and 50 in the traversing head forming a loop of variable depth between these pulleys, and is finally secured to rail 32 at the end away from reel 44. In the loop between pulleys 48 and 50 string 46 suspends the probe structure 52. Here 52 designates the entire structure of the electrostatic field probe and its support bracket assembly.

Operation of reel 44 will either raise or lower probe structure 52 in the vapor space. Operation of pulley 40 will move the probe toward the tank wall or the tank center into any radial location. Finally swinging rail 32 around track 30 will bring probe structure 52 into any angular position with respect to a vertical reference plane through the tank center. Thus, by the apparatus shown, probe structure 52 may be moved into any coordinate location in the vapor space of tank 20. It is not to be understood that the means of supporting and locating the electrostatic field probe is restricted to that shown in Fig. 1. It is required, however, that the immediate support for the probe, string 46 in Fig. 1, be of non-conducting material, preferably of small volume, and have a dielectric constant approximately equal to that of air. It would not, for example, be permissible to support the electrostatic field probe of this invention on a metal rod, for such a rod would distort appreciably the electrostatic field being probed.

Figure 2:
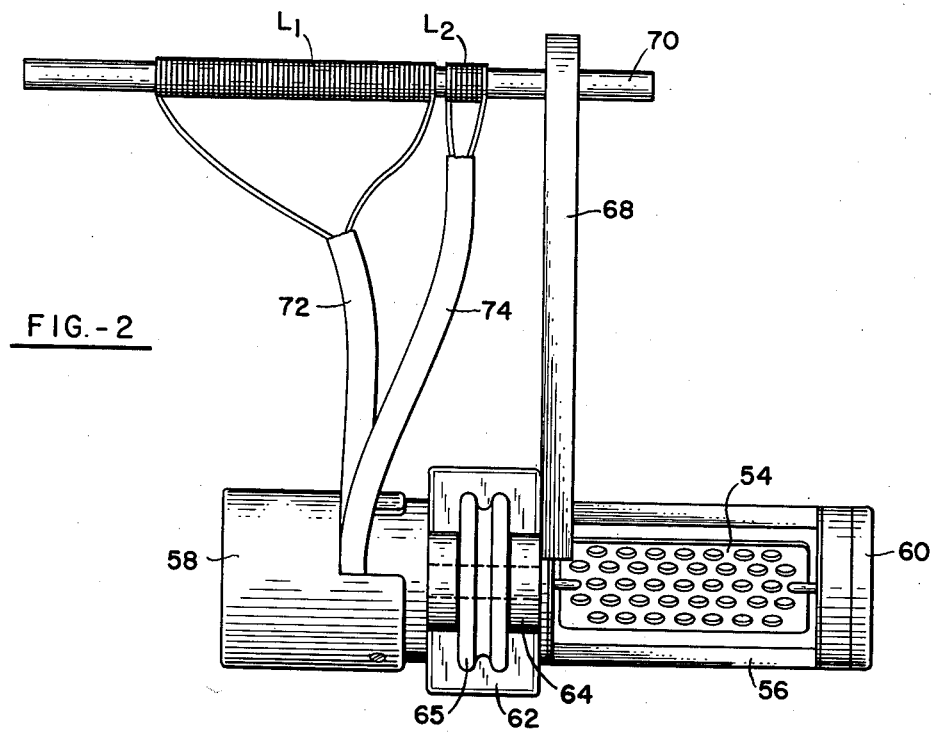
Fig. 2 represents a plan view of the electrostatic field probe in its support bracket assembly.
Figure 3:
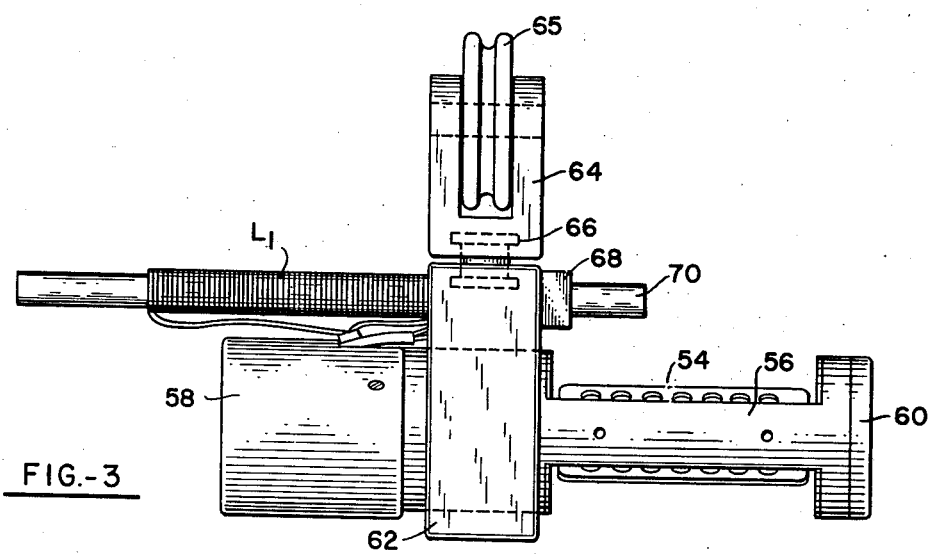
Fig. 3 represents a side elevation of the electrostatic field probe in its support bracket assembly.

Figs. 2 and 3 are respectively plan and side elevation views of assembly 52 which comprises the electrostatic field probe and its support bracket structure. Deflector vane 54 is rotatably mounted in a generally cylindrical casing 56 which is fitted with a cap 58 and an end plug 60. Vane 54 is shown extensively perforated corresponding to the model actually constructed. Such perforation is not, however, essential for the operation of the probe apparatus. Casing 56 passes through and is snugly but rotatably fitted in lower support bracket 62 made of non-conducting material. This bracket is attached to an upper support bracket 64, likewise of non-conducting material, by a swivel bolt 66. Upper bracket 64 carries pulley 65 which should be a non-conductor along with its pivot pin. Swivel bolt 66 is preferably fixed rigidly in either the upper or the lower bracket and rotatably secured in the other. The rotating fit should be sufficiently tight that however the lower bracket carrying the probe be turned with respect to the upper bracket, the adjustment will hold against ordinary vibration until changed intentionally. This applies also to the class of fit of casing 56 in lower bracket 62. Appropriate reference marks should be applied on casing 56 and brackets 62 and 64 to enable repetition of particular adjustments of these parts with respect to each other.

Attached to lower support bracket 62 is a non-conducting arm 68 which carries a ferrite rod 70 on which two coils $L_1$ and $L_2$ of the electrostatic field probe transmitter circuit are wound. These coils and rod 70 will be described further in later discussion of the transmitter circuit itself. The ends of the coils are gathered in two lengths of 300-ohm television lead-in wire 72 and 74. This lead-in wire should be used to maintain constant separation of the leads to each coil as far as possible. The leads themselves are brought back inside casing cap 58 to make appropriate connection with other transmitter circuit elements therein.

The support bracket structure as shown in Figs. 2 and 3 for the electrostatic field probe of this invention is exemplary only and any other suitable arrangement may be used. General requirements are, however, that its mass and surface be kept relatively low and that it be made of non-conducting material as far as possible. Especially there should be no metal parts of the bracket structure to shield the deflector vane 54 from the electrostatic field.

Figure 4:
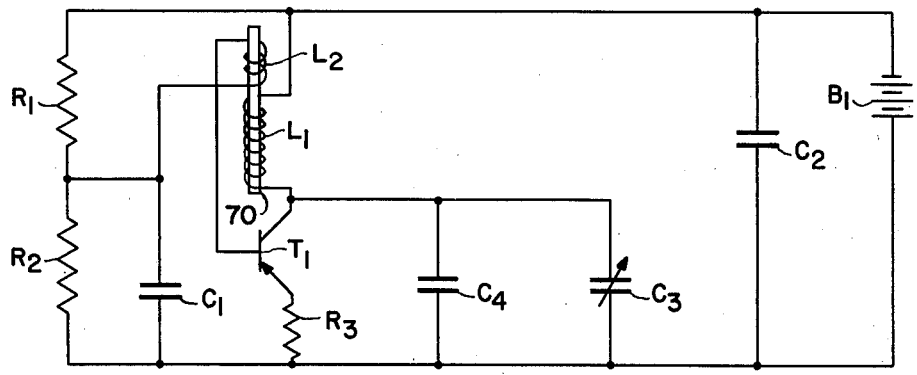
Fig. 4 represents a schematic diagram of the oscillator circuit of the electrostatic field probe by which a radio-frequency wireless signal is transmitted.

Fig. 4 shows a transmitter circuit of a design which has been used in the electrostatic field probe of this invention. This circuit will now be described, and element specifications given as this circuit has been built. It is not to be understood, however, that this is the only circuit which can be used. Rather what is shown is one transmitter circuit that can be employed for service over the transmitting distance and range of frequencies indicated.

The circuit of Fig. 4 is that of a frequency modulated, tuned collector transistor oscillator operating in class A; that is, the base of transistor $T_1$, type 2N140, is so biased that the collector current flows continuously. The circuit is powered by a 4-volt mercury cell or battery $B_1$. Coil $L_1$ made of about 80 turns of Litz wire wound on ferrite rod 70 about $5/16$ in. in diameter is the inductive part of the collector tank circuit as well as the radiating antenna. Variable capacitor $C_3$ is the tuning element of the probe transmitter circuit. Its rotor is mounted on the same shaft as deflector vane 54. $C_3$ has a range of approximately ten micromicrofarads between 60 and 70 micromicrofarads to give transmission over a range of 785 to 815 kilocycles.

Capacitor $C_4$ is an additional shunt capacitance of 33 micromicrofarads to tune the circuit to the desired center frequency of about 800 kilocycles. A secondary winding of about 10 turns of Litz wire shown as $L_2$ is wound on the ferrite rod closely following $L_1$ with the A.C. ground ends of the two coils adjacent. $L_2$ is connected to provide positive feedback to the base of the transistor. Resistors $R_1$, $R_2$, and $R_3$ of 18, 6.8 and 3.9 kilo-ohms respectively provide proper bias for the transistor. $R_3$ is effectively in series with the base to emitter capacitance of transistor $T_1$, and is of higher impedance. Consequently changes in the base to emitter capacitance with temperature or bias do not adversely affect the stability of the oscillator. Capacitors $C_1$ and $C_2$ both of 0.1 microfarad by-pass radio frequency signals; that is, they allow radio frequency alternating current to flow directly to ground without passing through other parts of the circuit.

For the circuit element specifications just given, an effective transmitting distance between transmitter and receiver antennae of about twenty feet may be anticipated. Since there is no switch in the circuit of Fig. 4, transmission will be continuous as long as all connections are made as shown. To disable the circuit during periods of non-use of the probe, battery $B_1$ should be removed.

The radio frequency signal radiated by coil $L_1$ is in the range detectable by ordinary radio receivers. A recommended means of determining the operating frequency of the transistor oscillator of Fig. 4 is as follows: use a superheterodyne receiver with an additional fixed oscillator set at the intermediate frequency; when the high frequency oscillator of the receiver is tuned to give the lowest frequency of audible beat note, its setting will indicate the received frequency.

Figure 5:
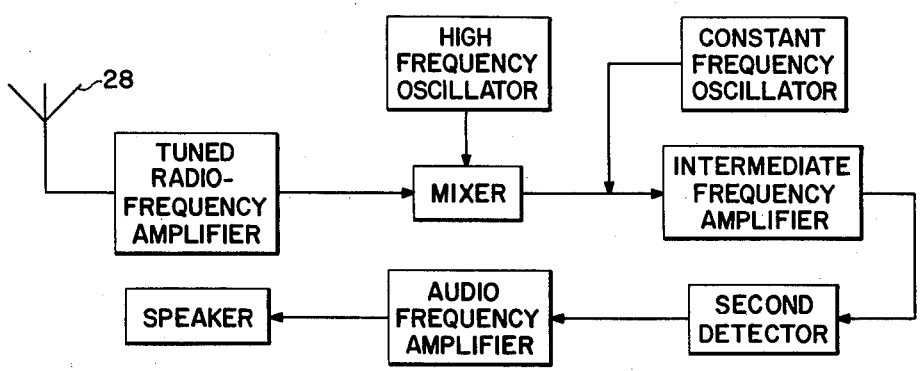
Fig. 5 represents a block diagram of a modified super-heterodyne radio receiver suitable for detecting and evaluating signals transmitted by the circuit shown in Fig. 4

Fig. 5 shows the block diagram of a superheterodyne receiver which has been modified according to the foregoing recommendation. The signal of the added constant frequency oscillator beats against that leaving the mixer stage ahead of the intermediate frequency amplifier. The frequency of the added oscillator should be the same as the designed value of the intermediate frequency, usually 455 kilocycles. When the high frequency oscillator is tuned to give the lowest frequency of beat note in the earphones or speaker, suitable correlation of receiver tuning value and potential gradient can be made. The receiver may be located outside the tank whose vapor space is being probed for potential gradients as shown in Fig. 1, but whatever kind of receiver is used, its antenna must be in the vapor space along with the electrostatic field probe itself so that there will be no tank wall shielding between the transmitting and receiving antennae; that is, probe antenna $L_1$ and receiver antenna 28 must be able to "see" each other.

Referring next to Fig. 6, the electrostatic field probe casing 56 is shown in longitudinal section. This casing is made of stainless steel, and in the model of this invention which has been constructed has an overall length of about 6 in., an outside diameter of 1⅞ in., and an inside diameter of 1½ in. It is only a complete continuous cylinder from planes 8—8 and A—A out to its ends. Between these planes two large symmetrical panels are cut away to expose deflector vane 54. Reference should be had to Fig. 7 to see the extent of cutting away of casing 56 in way of the deflector vane. Exposed edges of the ribs connecting the two complete cylindrical regions of casing 56 must be rounded to a radius of $1/32$ in. or larger to prevent corona effects. This requirement applies to exposed edges of the probe generally.

At one end casing 56 is closed with stainless steel plug 60 which is fastened to it with four screws 76. In the center of plug 60 is jewel bearing 78 which supports one end of the shaft which carries vane 54. Also centered in plug 60 is disk 80 to which is affixed one end of torque spring 82. Disk 80 may be turned in plug 60 to regulate the rest position of the deflector vane. This adjustment is discussed further in the detailed consideration of Figs. 7 and 8. The deflector vane 54 is made of high strength aluminum alloy. It is carried on a shaft consisting of two hollow stainless steel tubes 84 and 86. Attachment of these shaft sections to the vane may be by riveting or other appropriate means. Pointed inserts at the shaft ends support the rotating assembly in jewel bearings 78 and 88. These bearings are adjustable for minimum friction and centering of rotor plates 90 with respect to stator plates 92. A balance wheel 94 is mounted on shaft 86 fairly close to the deflector vane. The wheel flange is tapped radially to accommodate balance screws 96.

Variable capacitor $C_3$ has three rotor plates 90 and four stator plates 92. Representative rotor and stator plates are shown in greater detail in Figs. 9 and 10. These plates are each approximately .020 in. thick, and are separated by air gaps of .040 in. The rotor plates are located on shaft 86 by a series of press fit collars 98. The stator assembly is located between two heavy snap rings 100 and 102. These butt against two insulating rings 104 and 106 which enclose an insulating sleeve 108 fitted to the inside of casing 56. Inside of this sleeve is a brass sleeve 110. The stator plates 92 are fitted within this brass sleeve and are appropriately spaced by a series of snap rings 112. Prongs 114 and 116 provide electrical connection points for the rotor and stator plates respectively. Prong 114 is inserted in brass closure plate 118, and prong 116 is fastened to a snap ring of the stator stack.

It is desirable that the movement of the shaft assembly be subject to damping for mechanical stability. Such damping may be provided by means of copper disk 120 on shaft 86 which passes between the pole faces 122 and 123 of a semi-circular permanent magnet fitted inside casing 56.

The end of casing 56 near capacitor $C_3$ is closed with brass plate 118 which is fastened to the casing with three screws 121. Plate 118 carries jewel bearing 88 and capacitor rotor prong 114. It is penetrated with a sleeve 124 made of insulating material through which passes capacitor stator prong 116. The complete cylindrical regions of casing 56 which terminate at planes 2—2 and 3—3 are closed by pairs of thin stainless steel covers 126 and 128. These covers fit quite closely to the shafts 84 and 86 and to the walls and edges of casing 56. Their own outside edges are formed to suitable radii. They have mounting blocks brazed to them which are tapped to receive screws passing through casing 56 or end plug 60. Examples are blocks 130 and 132 and screws 134 and 136.

Casing cap 58 made of brass fits over the end of casing 56 as shown, and is fastened to it with three screws 138. The function of the cap is to provide enclosure for many of the elements of the transmitter circuit of Fig. 4, and also furnish electrical contact for the base of battery $B_1$. A non-conducting disk 140 is pressed into cap 58, and is drilled to allow the battery to pass through it to butt against the cap metal. The edge of cap 58 is cut away as necessary to allow passage of lead wires 72 and 74 of coils $L_1$ and $L_2$. This is shown clearly in Fig. 2. An interrupted rubber gasket 142 is cemented to an internal shoulder of the cap to actually butt against the end of casing 56.

144 and 146 are fibre plates on which elements of the transmitter circuit of the electrostatic field probe are assembled. In this assembly connections between elements are made both by wire and by "printed circuit" technique on the fibre plates as appropriate. Both sheets are pierced to allow passage of rotor and stator prongs 114 and 116. Sheet 144 is also pierced to allow passage of battery $B_1$. The center pole of this battery makes contact with a metal strip 147 on sheet 146.

Next consider Fig. 7 representing a view on transverse plane 7—7 through probe casing 56 and deflector vane 54. The important thing to note is the 30° rest or zero potential gradient angle of the vane with respect to a longitudinal centerline plane passing through casing 56 and bisecting the ribs which connect the complete cylindrical sections of the casing. Corresponding with the configuration of the rotor and stator plates of capacitor $C_3$, deflector vane 54 is intended to rotate through a range of 30°, that is, to an extreme position of 60° away from the aforementioned longitudinal centerline plane. After proper balancing, zero potential gradient position of the deflector vane is established by adjustment of disk 80 in base plug 60. This adjustment is considered in greater detail in discussion of Fig. 8.

In Fig. 7 two metal shielding plates 148 and 150 curved to the circumference of casing 56 are shown attached to the casing ribs with screws 152 and 154. Shields 148 and 150 may be made in various arcs. They are not essential to the fundamental operation of the probe, but refine its directionality by reducing the effective aperture of exposure of deflector vane 54. At the same time they decrease the probe's sensitivity.

The mechanism for adjusting the rest position of the deflector vane may be understood by considering Figs. 6 and 8. Torque spring 82 in the form of an eight-turn spiral has its inner end attached to a brass collar 156 on shaft 84 and its outer end secured in block 158 which is mounted on disk 80. This disk is set rotatably in casing plug 60. The elastic constant necessary for spring 82 should be about 2 dyne-cm./degree rotation in keeping with other dimensions here specified.

A set screw 160 passing through casing 56 and plug 60 bears on the side of the section of reduced diameter of adjusting disk 80, and locks this disk in radial position with respect to the plug and casing. The edge of the section of larger diameter of disk 80 is knurled. As disk 80 is turned one way or the other in plug 60, spring 82 will turn shaft 84 and establish a new angular position for the deflector vane. In order to reset disk 80 it is only a matter of removing covers 126, loosening set screw 160, turning the disk as desired, and then tightening screw 160 and replacing covers 126 after a satisfactory adjustment has been achieved.

Figure 9:
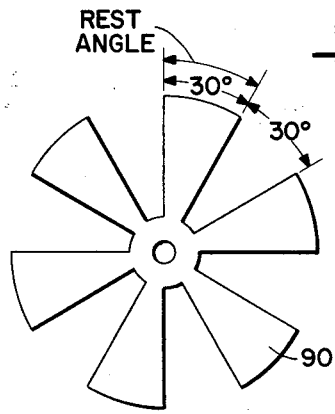
Fig. 9 represents a typical rotor plate of the variable capacitor shown in Fig. 6.
Figure 10:
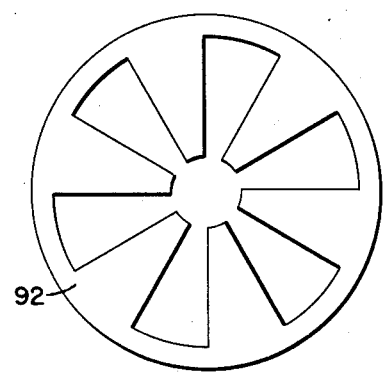
Fig. 10 represents a typical stator plate of the variable capacitor shown in Fig. 6.

Detailed end elevation views of typical rotor and stator plates 90 and 92 are given in Figs. 9 and 10. Note the indication of the rest angle of the rotor plate. With the rotor assembly in rest or zero potential gradient position, the capacitor rotor plate sectors should be in way of the stator slots so that capacitance of variable capacitor $C_3$ is increased from its lowest value as deflector vane 54 is turned away from its rest position.

One apparatus embodiment of this invention having been particularly described, its mode of operation in determining magnitude and line of action of potential gradients will now be set forth.

As a first step in the use of this invention, a calibration must be established between potential gradient to which deflector vane 54 of the electrostatic field probe is exposed, and transmitting frequency of the oscillator circuit of the probe. To do this, the probe should be placed with a particular orientation and particular degree of deflector vane shielding in a uniform electrostatic field of known direction and intensity; the field intensity varied to give a series of calculable gradients at the probe to turn deflector vane 54 through its entire 30° range, and a corresponding series of transmitting frequencies observed. It will be convenient if this calibration be performed with the probe casing 56 so oriented in the field that the gradient vector will be perpendicular to a longitudinal centerline plane through the casing which bisects the connecting ribs.

There will, of course, be a different calibration of potential gradient against transmitting frequency for each condition of shielding of deflector vane 54 for a given orientation of the probe in a field of known direction. This is said with reference to any sets of shielding plates 148 and 150 which may be used according to Fig. 7.

Now suppose that a particular coordinate location in vapor space 24 has been selected at which it is desired to determine the magnitude and line of action of the potential gradient. Next suppose that the electrostatic field probe assembly 52 is positioned to bring deflector vane 54 into this location and that casing 56 is oriented in lower support bracket 62 as shown in Figs. 2 and 3, that is, with the two ribs of the casing in horizontal line with each other. Suppose further that the vane axis is oriented according to Fig. 1, that is, at right angles to diametral rail 32. Radio receiver 26 will detect a certain output frequency of the probe transmitter circuit. The corresponding value of potential gradient determined according to the calibration experiment just described will be the vertical component of gradient vector at the vane.

The probe should then be withdrawn to allow the operator to rotate casing 56 in bracket 62 by 90°; that is, turn it to bring the casing ribs in line vertically. Next the probe will be repositioned to place vane 54 in the selected location; output frequency detected, and corresponding value of potential gradient noted which will be the radial component of the gradient vector at the vane. The probe will then be withdrawn once more, lower support bracket 62 turned 90° with respect to upper bracket 64, and the foregoing positioning and detecting operations repeated to give a chordal component of the gradient vector at the vane. By this procedure three mutually perpendicular components of the potential gradient vector will be obtained which may be composed by well known methods to determine the magnitude of this vector and its line of action.

For complete determination of the gradient vector, additional information concerning potentials in the electrostatic field is needed to establish the sense of the vector along its line of action. Such information is not provided by the apparatus of this invention, but this does not lessen the value of the invention in the major application contemplated, namely, detection of incipient sparking conditions in the vapor spaces of tanks for storage of combustible fluids. The danger of sparking at any point in such vapor space is a function only of potential gradient magnitude at that point, and full determination of gradient magnitude is provided by this invention.

What is claimed is:

1. An apparatus for determining the magnitude and line of action of the potential gradient at any point in an electrostatic field which comprises a probe having directional sensitivity for potential gradients and capable of transmitting a radiofrequency wireless signal whose frequency is a function of the magnitude of the vector component of potential gradient sensed by said probe, said probe comprising a cylindrical stainless steel casing symmetrically slotted for part of its length with two opposite through cuts, closure plugs in each end of said cylinder, adjustable jewel bearings in the centers of said plugs, a rotating assembly carried in said bearings comprising in sequence at least one plate adapted to form a rotor plate of a variable capacitor, a copper damping disk, a balance wheel, and a flat metal vane aligned with said cuts in said casing all mounted on appropriate shaft elements, a clock spring attached at its inner end to said rotating assembly to oppose angular motion thereof with respect to said casing, a mounting for the outer end of said spring set rotatably in the closure plug of said casing nearer said vane to establish a reference angular position for said rotating assembly, releasable means for locking said mounting in any angular position with respect to said casing, thin metal transverse covers for said casing closely fitted around shaft elements of said rotating assembly at either end of said vane, curved metal shields attached to the outside of said casing in way of said cuts to regulate the apertures through which said vane is externally exposed, a permanent magnet mounted inside said casing in line with said copper disk, at least one insulated plate adapted to form a stator plate of a variable capacitor mounted within said casing in such spaced relation to said plate of said rotating assembly to form a variable capacitor, a ferrite rod external to said casing and held in spaced relation thereto by support means extending therefrom, circuit elements in addition to said variable capacitor and including primary and secondary coils all connected to form a battery powered radiofrequency transmitter-oscillator, said elements except for said primary and secondary coils being in an assembly mounted on the end of said casing nearer said variable capacitor and said primary and secondary coils being wound on said ferrite rod, said primary coil constituting a radiating antenna for said transmitter-oscillator, and a metal cap fitted over the end of said casing nearer said variable capacitor, and enclosing said circuit element assembly mounted on said casing end; and a radio receiver capable of detecting wireless signals in the range of frequencies transmitted by said probe and having its pickup antenna in unshielded relation to the radiating antenna of said probe.

2. An electrostatic field probe which includes a radiofrequency transmitter-oscillator apparatus having variable tuning means, a field sensing means rotatable under the influence of electrostatic field potential gradients connected to said tuning means whereby said tuning means may be varied, said field sensing means including a metal vane adapted for at least partial exposure to an electrostatic field, and resilient means whereby rotation of said sensing means with respect to said transmitter-oscillator is yieldably resisted.

3. An electrostatic field probe according to claim 2 in which said variable tuning means comprises a capacitor.

4. An electrostatic field probe according to claim 2 in which said resilient means whereby rotation of said sensing means with respect to said transmitter-oscillator is yieldably resisted is adjustable to provide a reference angular setting of said metal vane with respect to said transmitter-oscillator.

5. An electrostatic field probe according to claim 2 which includes a source of energy whereby said transmitter-oscillator is operated.

6. An electrostatic field probe according to claim 2 which includes shielding means whereby the extent of exposure of said metal vane to an electrostatic field may be varied.

7. An electrostatic field probe according to claim 2 which includes means for damping oscillation of said sensing means with respect to said transmitter-oscillator.

8. An electrostatic field probe which comprises a cylindrical casing symmetrically slotted for at least part of its length with at least two opposite through cuts, a field sensing means rotatably mounted within said casing including a metal vane aligned with said cuts in said casing, at least one plate fixedly mounted on said sensing means and adapted to form a rotor plate of a variable capacitor, spring means whereby angular motion of said field sensing means with respect to said casing is yieldably opposed, at least one insulated plate adapted to form a stator plate of a variable capacitor mounted within said casing in such spaced relation to said plate of said field sensing means to form a variable capacitor, and circuit elements in addition to said variable capacitor mounted on said casing and including primary and secondary coils all connected to form a radio frequency transmitter-oscillator with said primary coil constituting a radiating antenna therefor.

9. An electrostatic field probe according to claim 8 in which said spring means is adjustable to provide a reference angular setting of said metal vane with respect to said casing.

10. An electrostatic field probe according to claim 8 which includes a battery whereby said transmitter-oscilator is operated.

11. An electrostatic field probe according to claim 8 which includes shielding means whereby the extent of exposure of said metal vane through said cuts may be varied.

12. An electrostatic field probe according to claim 8 which includes means for damping oscillation of said sensing means with respect to said casing.

13. An electrostatic field probe according to claim 8 which includes a ferrite rod whereon said primary and secondary coils are wound, said rod being external to said casing and held in spaced relation thereto by support means extending therefrom.

References Cited in the file of this patent

UNITED STATES PATENTS

| 2,449,068 | Gunn | Sept. 14, 1948 |
| 2,768,368 | Crane et al. | Oct. 23, 1956 |
| 2,820,947 | Gunn | Jan. 21, 1958 |